United States Patent
Zhang et al.

(10) Patent No.: US 11,948,611 B2
(45) Date of Patent: Apr. 2, 2024

(54) NON-RIGHT ANGLE PARALLELOGRAM PZT FOR SUSPENSION RESONANCE IMPROVEMENT

(71) Applicant: Magnecomp Corporation, Murrieta, CA (US)

(72) Inventors: Long Zhang, Winchester, CA (US); Kuen Chee Ee, Chino, CA (US); David Glaess, Bangkok (TH)

(73) Assignee: Magnecomp Corporation, Murrieta, CA (US)

( * ) Notice: Subject to any disclaimer, the term of this patent is extended or adjusted under 35 U.S.C. 154(b) by 0 days.

(21) Appl. No.: 18/110,863

(22) Filed: Feb. 16, 2023

(65) Prior Publication Data

US 2023/0267955 A1 Aug. 24, 2023

Related U.S. Application Data

(60) Provisional application No. 63/312,698, filed on Feb. 22, 2022.

(51) Int. Cl.
*G11B 5/48* (2006.01)
*G11B 5/55* (2006.01)

(52) U.S. Cl.
CPC .......... *G11B 5/4833* (2013.01); *G11B 5/5578* (2013.01)

(58) Field of Classification Search
CPC ............... G11B 5/4833; G11B 5/5578
See application file for complete search history.

(56) References Cited

U.S. PATENT DOCUMENTS

| | | | | |
|---|---|---|---|---|
| 5,412,523 A | * | 5/1995 | Hescher | G11B 5/53 |
| | | | | 360/291.9 |
| 5,898,544 A | * | 4/1999 | Krinke | G11B 5/5552 |
| 6,176,570 B1 | | 1/2001 | Kishima et al. | |
| 7,131,346 B1 | * | 11/2006 | Buttar | G11B 27/36 |
| | | | | 73/865.9 |
| 7,448,727 B2 | * | 11/2008 | Rai | B41J 2/155 |
| | | | | 347/68 |
| 7,477,489 B1 | * | 1/2009 | Chen | G11B 5/4833 |
| | | | | 360/294.4 |
| 7,804,231 B2 | | 9/2010 | Ifuku et al. | |
| 8,630,067 B2 | * | 1/2014 | Ando | G11B 5/5552 |
| | | | | 360/294.4 |
| 9,013,835 B2 | | 4/2015 | Chua | |
| 9,437,230 B2 | * | 9/2016 | Hatch | G11B 5/483 |
| 10,696,047 B2 | | 6/2020 | Bibl et al. | |

(Continued)

OTHER PUBLICATIONS

International Search Report and Written Opinion in International Application No. PCT/US2023/013544, dated Jun. 1, 2023.

*Primary Examiner* — Brian E Miller
(74) *Attorney, Agent, or Firm* — DLA Piper LLP (US)

(57) ABSTRACT

Examples of a suspension are provided. The suspension includes a mount plate attached to a load beam at a suspension assembly attachment point. The suspension may include a first actuator and a second actuator located at the mount plate. The first actuator is shaped as a non-right angle parallelogram spanning across a first opening in the mount plate. The second actuator is shaped as a non-right angle parallelogram spanning across a second opening in the mount plate. The first and second actuators are configured to deflect the distal end of the mount plate, which causes the load beam to rotate with a rotation center located along the load beam.

15 Claims, 7 Drawing Sheets

(56) References Cited

U.S. PATENT DOCUMENTS

| | | | |
|---|---|---|---|
| 2001/0050833 A1* | 12/2001 | Murphy | G11B 5/4873 |
| 2002/0064001 A1* | 5/2002 | Shiraishi | G11B 5/5552 |
| 2003/0123196 A1* | 7/2003 | Shiraishi | H10N 30/2045 |
| 2005/0262959 A1 | 12/2005 | Angeles et al. | |
| 2007/0097554 A1* | 5/2007 | Yao | G11B 5/486 |
| 2007/0188931 A1* | 8/2007 | Yao | G11B 5/4826 |
| 2013/0094106 A1* | 4/2013 | Chua | G11B 5/4873 |
| | | | 29/603.01 |
| 2015/0194171 A1 | 7/2015 | Chua | |
| 2019/0295574 A1 | 9/2019 | Hahn et al. | |

\* cited by examiner

NON-RIGHT ANGLE PARALLELOGRAM PZT FOR SUSPENSION RESONANCE IMPROVEMENT

CROSS-REFERENCE TO RELATED APPLICATIONS

This application claims the benefit of, and priority to, U.S. Provisional Application No. 63/312,698 filed on Feb. 22, 2022, which is hereby incorporated by reference in its entirety.

FIELD

The present disclosure relates generally to suspensions for supporting read/write heads over recording media. In particular, the present invention is a head suspension assembly having a pair of PZT milli-actuators mounted on the mount plate.

BACKGROUND

Disk drives include disk drive suspension assemblies for supporting read/write heads over information tracks of rotating disks. The well-known and widely used Watrous-type suspensions include a load beam having a mounting region on a proximal end, a flexure on a distal end, a relatively rigid region adjacent to the flexure and a spring region between the mounting region and rigid region. An air-bearing slider which includes the read/write head is mounted to the flexure. The mounting region is typically attached to a mount plate for mounting the load beam to an actuator arm. A motor which is controlled by a servo control system rotates the actuator arm to position the read/write head over desired information tracks on the disk. This type of suspension is used with both magnetic or non-magnetic disks.

Disk drive manufacturers continue to develop smaller yet higher storage capacity drives. Storage capacity increases are achieved in part by increasing the density of the information tracks on the disks (i.e., by using narrower and/or more closely spaced tracks). As track density increases, however, it becomes increasingly difficult for the motor and servo control system to quickly and accurately position the read/write head over the desired track.

Figure 1:
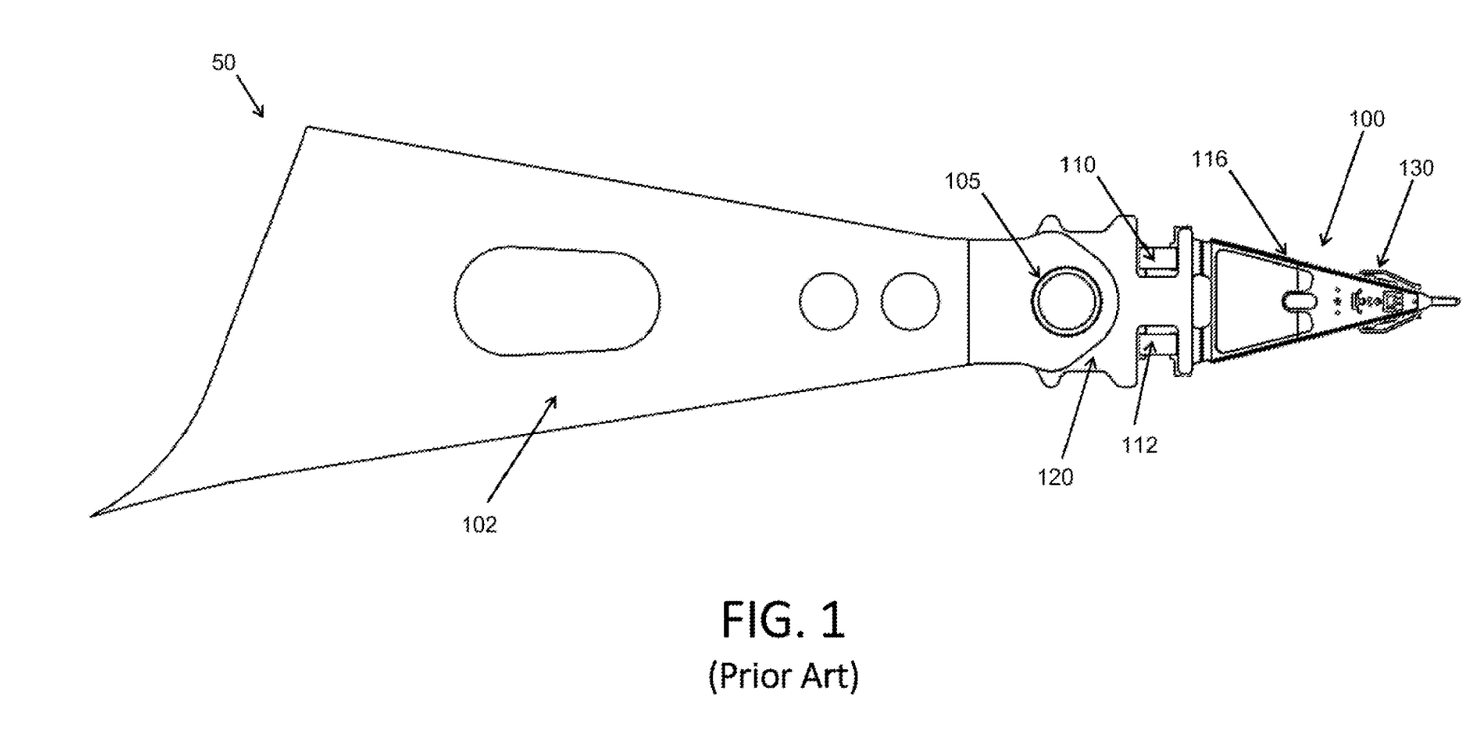
FIG. 1 illustrates a conventional suspension assembly with a tri-stage suspension.
Figure 2:
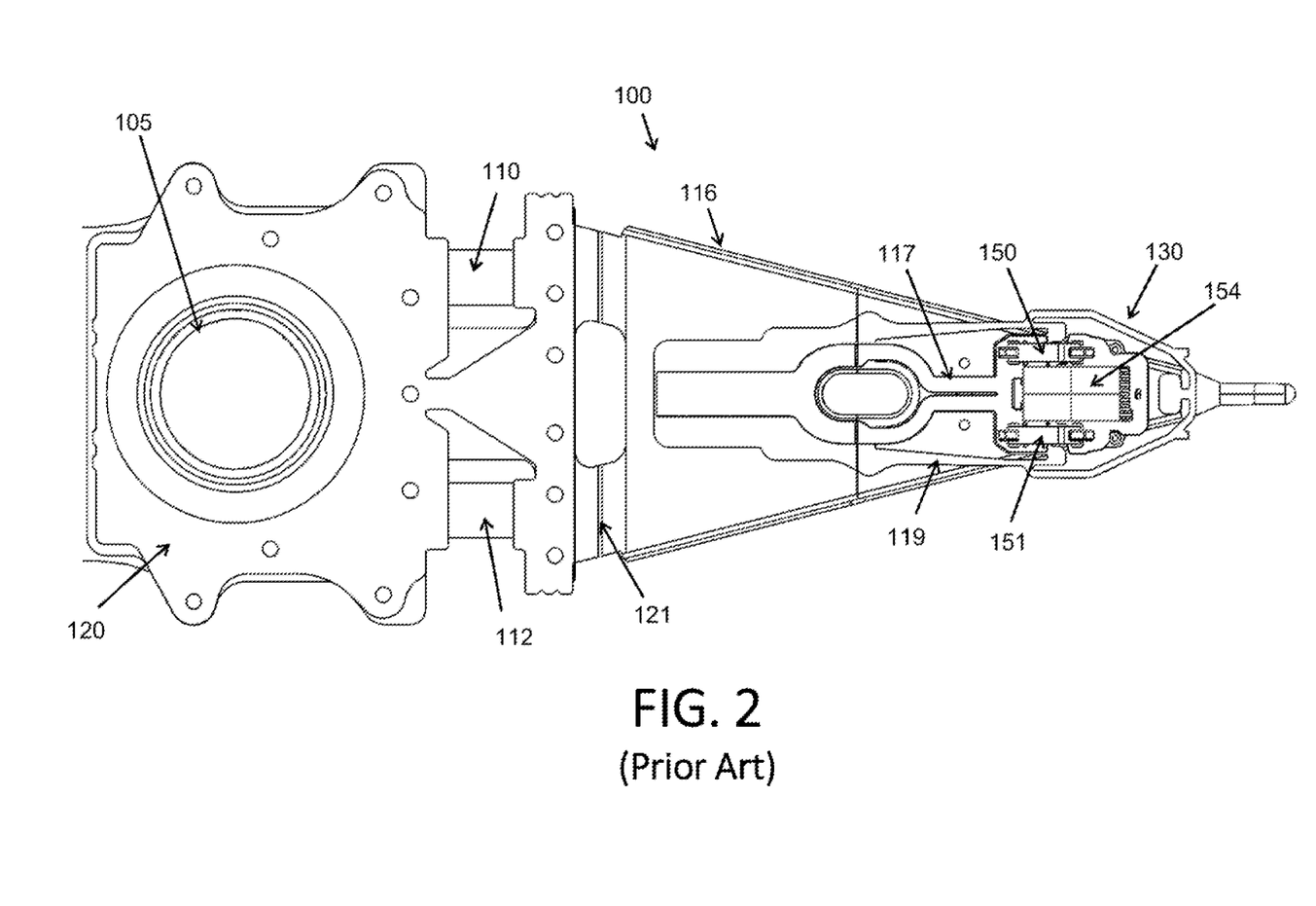
FIG. 2 illustrates a gimbal assembly of the tri-stage conventional suspension of FIG. 1.

The use of head suspensions having PZT actuators or fine tracking motors has been proposed to overcome these problems. FIGS. 1 and 2 illustrate a conventional suspension assembly 50 with an exemplary tri-stage suspension 100. In general, tri-stage suspension 100 includes three actuators, such as for example: a voice coil motor (VCM) (not shown) generally configured to rotate a suspension arm, a pair of milli-actuators mounted on a mount plate and generally configured to rotate a load beam, and a pair of gimbal micro-actuators generally configures to rotate a slider which carried a read/write head. In some embodiments, the milli-actuator actuation has higher stroke, which enables the servo control to attenuate low frequency vibration noise, while the gimbal micro-actuator actuation has a cleaner PZT frequency response function (FRF) which is used to boost the servo bandwidth.

As shown in FIGS. 1 and 2, the suspension 100 may be swaged onto a head stack arm 102. The suspension 100 includes supporting arms 119, and a gimbal assembly 130 that includes a slider 154 having a read/write head configured to read and write digital information from and to a rigid rotating disk (not shown). The suspension 100 may be semi-rigid, and includes a stainless-steel load beam 116 that terminates in a hinge member 121 which is attached to a mount plate 120. The mount plate 120 is connected to the head stack arm 102 at attachment point 105.

Also attached to the load beam 116 is a flexure assembly that includes a flexible stainless-steel flexure and flex circuit 117 (shown in FIG. 2). The flex circuit 117 is made of a top and bottom electrically non-conductive polyimide layers with multiple, electrically conductive metal traces sandwiched in between.

The load beam 116 can be manufactured from planar stainless-steel sheets that are subsequently chemically etched to almost any two-dimensional design within the limitations of process tolerances. Typical etched features are holes, slots, beams and hinges. The flat patterned stainless-steel sheets are then formed into desired three-dimensional shapes.

The suspension assembly 50 can include a servo-controlled actuator to position the slider 154 of the gimbal assembly 130 on a desired track. The actuator moves the slider 154 from one track to another in a process called seek. It also maintains the slider's 154 position on a desired track in a process called track following. The suspension assembly 50 can include a VCM (not shown) attached to the head stack arm 102 to control slider 154 positioning. As track density increases, VCM's have limitations in resolution and frequency response. To increase storage capacity and increase track density, tri-stage actuators have been developed.

The tri-stage actuators use a VCM actuator for seeking and coarse track following, and use a pair of actuators 110, 112 at the mount plate 120 and a pair of micro-actuators 150, 151 at the gimbal assembly 130 for fine track positioning. The use of the words motor, milli-actuator and micro-actuator appear throughout this document. All three are types of actuators which are directed mechanisms for generating motion, but to different degrees of motion magnitude and/or precision with respect to the read/write head.

The actuators at the mount plate 120 (for rotating load beam 116) include a first actuator 110 and a second actuator 112. The first and second actuators 110, 112 may be configured as suspension level actuators integrated into the load beam 116. These actuators can be rectangular piezoelectric devices that expand and contract in response to electrical signals to rotate load beam 116 thus providing large displacements at the recording element because the slider is assembled on the distal end of the load beam 116.

The micro-actuators at the gimbal assembly 130 include a first micro-actuator 150 and a second micro-actuator 151. The first and second micro-actuators 150, 151 are integrated within the gimbal assembly 130. The first and second micro-actuators 150, 151 work in expansion mode and contract mode respectively to rotate the gimbal flexure tongue onto which the head slider 154 is assembled.

The present example of FIGS. 1 and 2 configures the first and second actuators 110, 112 in a recessed area of the mount plate 120 to provide sufficient stroke. As actuators 110, 112 expand and contract in response to applied voltages, they deflect the distal end of mount plate 120 (to which the hinge member 121 is attached), thus causing load beam 116 to rotate. However, since the first and second actuators 110, 112 are so close to the tip of head stack arm 102, the arm sway mode can be easily excited during the actuation of the first and second actuators 110, 112.

Figure 3:
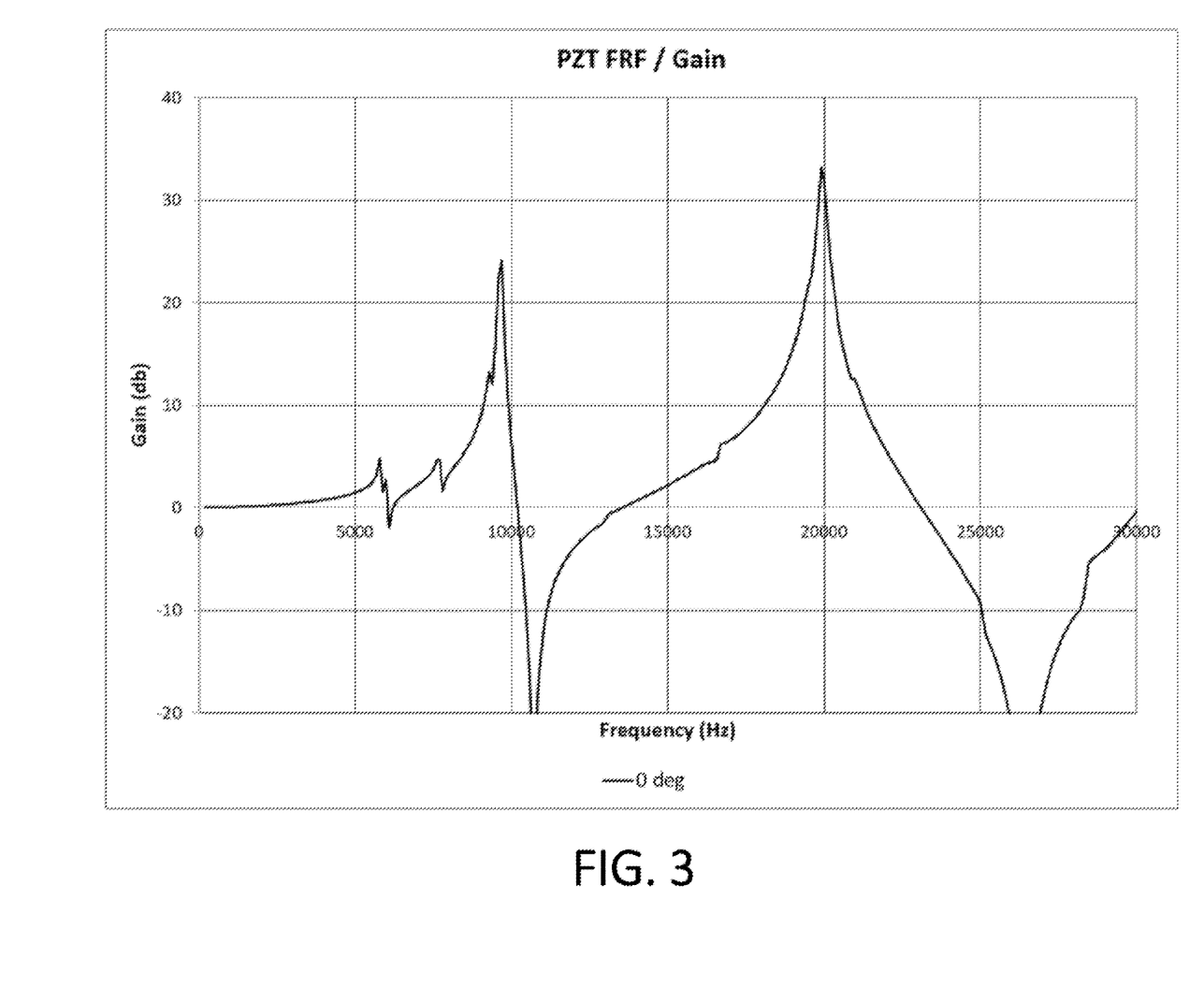
FIG. 3 is a graphical illustration of the frequency response function of the tri-stage suspension of FIG. 1.

FIG. 3 is a graphical illustration of the frequency response function of the exemplary suspension 100 of FIGS. 1 and 2. The first and second actuators 110, 112 have a high gain at about 10 kHz identified as the arm sway mode. Such a big peak occurs at the low frequency range, which compromises the servo bandwidth of the tri-stage suspension 100. Therefore, it is desired to minimize the arm sway gain in order to maximize the servo bandwidth of the tri-stage suspension 100.

There is a continuing need for improved head suspensions having PZT actuators. In particular, the head suspension must be capable of quickly and accurately positioning the read/write head. To be commercially viable, the head suspension must also be reliable and capable of being efficiently manufactured.

SUMMARY

Examples of a suspension are provided. The suspension includes a mount plate attached to a load beam at a suspension assembly attachment point. The suspension may include a first actuator and a second actuator located at the mount plate. The first actuator is shaped as a non-right angle parallelogram spanning across a first opening in the mount plate. The second actuator is shaped as a non-right angle parallelogram spanning across a second opening in the mount plate.

In another embodiment, a suspension assembly is provided which includes a mount plate attached to a distal end of a load beam. A first actuator may be attached to the load beam, wherein the first actuator has a non-right angle parallelogram shape and is configured to deflect the distal end of the mount plate. A second actuator may be attached to the load beam, wherein the second actuator has a non-right angle parallelogram shape and is configured to deflect the distal end of the mount plate.

In some embodiments, the suspensions may further include first and second actuators having a first set of parallel sides, a second set of parallel sides, and an acute angle of less than 45 degrees at an intersection of at least one of the first set of parallel sides and at least one of the second set of parallel sides. Optionally, the first actuator may be configured to expand toward the distal end and a first side edge of the mount plate; and the second actuator may be configured to expand toward the distal end and a second side edge of the mount plate.

Other features and advantages of examples of the present disclosure will be apparent from the accompanying drawings and from the detailed description that follows.

BRIEF DESCRIPTION OF THE DRAWINGS

Examples of the present disclosure are illustrated by way of example and not limitation in the figures of the accompanying drawings, in which like references indicate similar elements and in which.

DETAILED DESCRIPTION

Examples of a suspension are provided. The suspension includes a mount plate attached to a load beam at a suspension assembly attachment point. The suspension may include a first actuator and a second actuator located at the mount plate. The first actuator is shaped as a non-right angle parallelogram spanning across a first opening in the mount plate. The second actuator is shaped as a non-right angle parallelogram spanning across a second opening in the mount plate. The advantages of using actuators having a non-right angle parallelogram shape is detailed below.

While one suspension design is referenced herein, it should be understood that any number of suspensions may be implemented herein. Furthermore, while a tri-stage suspension 100 is illustrated herein, it should be understood that the following disclosure may be implemented in a dual-stage suspension.

To achieve desired performance of the servo bandwidth, the tri-stage suspension is introduced to the industry with the PZT milli-actuators assembled on the mount plate and the PZT micro-actuators assembled on the flexure tongue. The PZT milli-actuators work to provide a larger stroke and coarser head positioning and the PZT micro-actuators work to provide better resonant performance and finer head positioning.

Figure 4A:
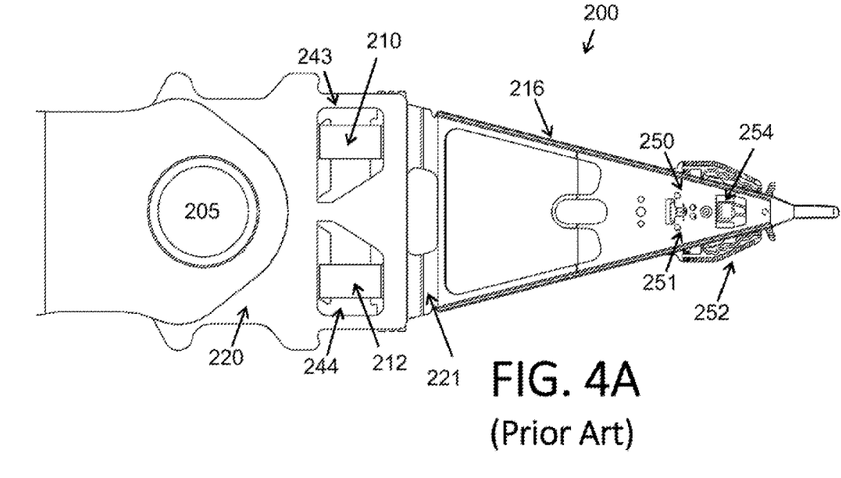
FIG. 4A illustrates a conventional mount plate region of an exemplary tri-stage suspension.

FIG. 4A illustrates another example of a conventional tri-stage suspension 200, which uses a pair of rectangular shaped milli-actuators 210 and 212 and includes a gimbal assembly 252 with a slider 254 having a read/write head configured to read and write digital information from and to a rigid rotating disk (not shown). Similar to the suspension 100 of FIG. 1, the suspension 200 may be semi-rigid and include a stainless-steel load beam 216 that terminates in a hinge member 221 which is connected to a mount plate 220. The mount plate 220 is connected to arm 202 at the suspension assembly attachment point 205.

The load beam 216 can be manufactured from planar stainless-steel sheets that are subsequently chemically etched to almost any two-dimensional design within the limitations of process tolerances. Typical etched features are holes, slots, beams and hinges. The flat patterned stainless-steel sheets are then formed into desired three-dimensional shapes.

The suspension 200 may include a pair of milli-actuators 210 and 212 in openings 243 and 244 in the mount plate 220, and a pair of micro-actuators 250 and 251 at the gimbal assembly 252 for fine track positioning. The micro-actuators at the gimbal assembly 252 include a first micro-actuator 250 and a second micro-actuator 251. The first and second micro-actuators 250, 251 have the micro-actuator integrated within the gimbal assembly 252.

Figure 4B:
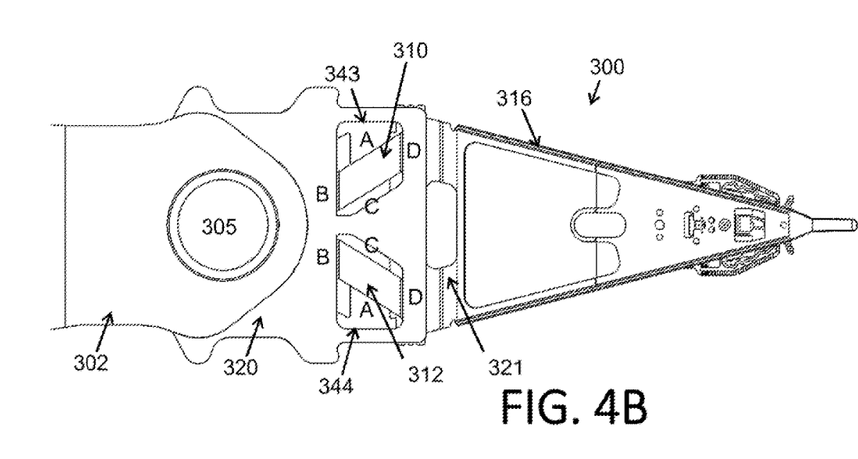
FIG. 4B illustrates a mount plate region of an exemplary tri-stage suspension, according to an example of the disclosure.

FIG. 4B illustrates an embodiment of the current invention, which includes the features of FIG. 4A except as noted below. The suspension 300 includes a pair of milli-actuators at the mount plate 320 having a first actuator 310 and a second actuator 312. The first actuator 310 is a piezoelectric device that may be shaped as a non-right angle parallelogram spanning across an opening 343 in the mount plate 320. The non-right angle parallelogram shape of the first actuator 310 assists in optimizing the arm sway gain of the first actuator 310. The second actuator 312 is a piezoelectric device that may be shaped as a parallelogram spanning across an opening 344 in the mount plate 320. The non-right angle parallelogram shape of the second actuator 312 assists in optimizing the arm sway gain of the second actuator 312.

A parallelogram is a quadrilateral having four straight sides where opposite sides are of equal length and are parallel to each other. For this disclosure, a non-right angle parallelogram is a parallelogram where no adjacent sides meet at a right angle (i.e., two of the opposing interior angles are equal and acute (less than 90 degrees), and the other two opposing interior angles are equal and obtuse (greater than 90 degrees)). As illustrated in FIG. 4B, the first actuator 310 may include a first set of parallel sides A and C, and a second set of parallel sides B and D. The first actuator 310 includes acute interior angles at the intersection of sides A and D and at the intersection of sides B and C, and obtuse interior angles at the intersection of sides A and B and at the intersection of sides C and D. Thus, even though side B is parallel to the distal end of mount plate 320, the first actuator 310 extends (and is configured to expand) from the suspension assembly attachment point 305 in a direction parallel with sides A and C. Similarly, the second actuator 312 includes acute interior angles at the intersection of sides A and D and at the intersection of sides B and C, and obtuse interior angles at the intersection of sides A and B and at the intersection of sides C and D. Thus, even though side B is parallel to the distal end of mount plate 320, the second actuator 312 extends (and is configured to expand) from the suspension assembly attachment point 305 toward both the distal end in parallel with sides A and C.

The use of a non-right angle parallelogram shaped piezoelectric (PZT) device for each of the actuators 310, 312 helps optimize the arm sway gain of the PZT actuator frequency response function compared to the rectangular shaped actuators in FIG. 4A. The first and second actuators 310, 312 may be configured as suspension level non-right angle parallelogram actuators, integrated into the suspension's load beam 316. For each actuator 310, 312, sides B and D are engaged with the sides of the respective openings 343, 344, so that when the actuator expands due to voltage being applied across its top and bottom surface electrodes, it deflects the distal end of mount plate 320 (to which the hinge member 321 is attached), thus causing load beam 316 to rotate.

Figure 5:
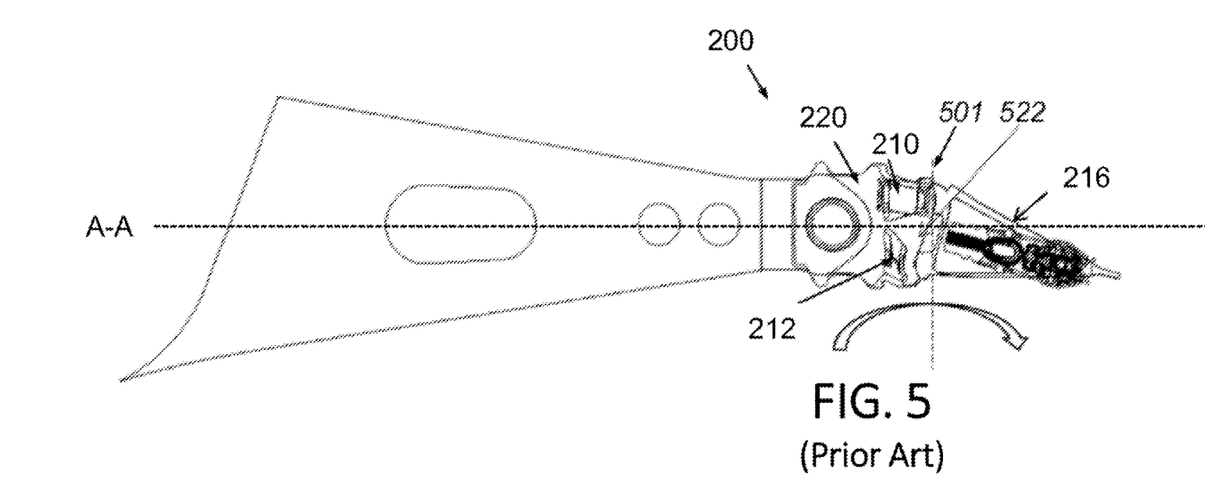
FIG. 5 illustrates a rotation center of the conventional tri-stage suspension of FIG. 4A.

FIG. 5 illustrates the rotation center for the conventional tri-stage suspension 200 of FIG. 4A that uses the rectangular shaped milli-actuators. The rectangularly shaped first and second actuators 210, 212 deflect the distal end of the mount plate 220 to cause the load beam 216 to rotate with a rotation center 501 located near the distal end 522 of mount plate 220. The coincidence of the rotation center 501 and distal end 522 results from the fact that the rectangular actuators are placed in parallel to the longitudinal axis A-A of the suspension, which causes rotation of the load beam 216 about distal end 522. As the rotation center 501 is on the proximal end of the load beam 216, the magnetic head slider assembled on the distal end of the load beam 216 can have a large stroke or displacement over the tracks. However, as the rotation of the load beam 216 is centered at the tip of the mount plate 220, the arm sway mode can be easily excited under the actuation mode of the conventional rectangular shaped actuators configured in parallel to the longitudinal axis A-A of the suspension. Changing the angle between two actuators 210 and 212 may help to change the rotation center of the load beam 216, but it requires to modify the geometries of the respective openings 243 and 244, which usually tends to weaken the stiffness of the mount plate 220 and adversely affects the resonance performance of the suspension, especially the critical low frequency modes including the first bending mode, the first torsion mode, etc.

Figure 6:
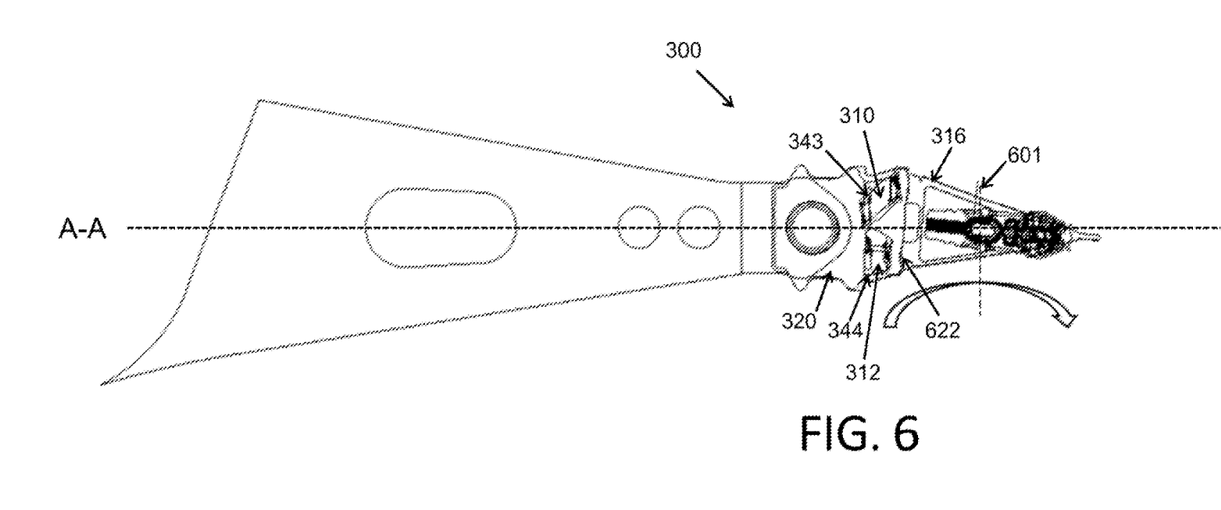
FIG. 6 illustrates a rotation center of the exemplary tri-stage suspension of FIG. 4B, according to an example of the disclosure.

FIG. 6 illustrates the rotation center of the exemplary tri-stage suspension of FIG. 4B. The non-right angle parallelogram first and second actuators 310, 312 deflect the distal end 622 of the mount plate 320 to cause the load beam 316 to rotate with a rotation center 601 located near a center of load beam 316. The coincidence of the rotation center 601 and the center of the load beam 316 results from the fact that the two actuators 310 and 312 are configured in the certain amount of angles with respect to each other without the need of modifying the openings 343 and 344. With the non-right angle parallelogram shape, the proximal ends of actuators 310 and 312 can be configured close to the center of the suspension, and the distal ends of the actuators 310 and 312 can be configured toward the lateral side edge of the suspension while maintaining the design of mount plate 320. As the attacking angle of the PZT actuators 310, 312 increases or the obtuse interior angles at the intersection of sides A and B increases, the rotation center of the PZT actuation is moved from the tip of the mount plate 320 toward the distal end of the load beam 316. Such a rotation center shift enables the head slider to have an opposite rotation movement to the head stack arm 302 about the rotation center. As a result, the arm sway gain can be optimized by appropriately tuning the rotation center to balance the mass moment of inertia about the rotation center.

Figure 7:
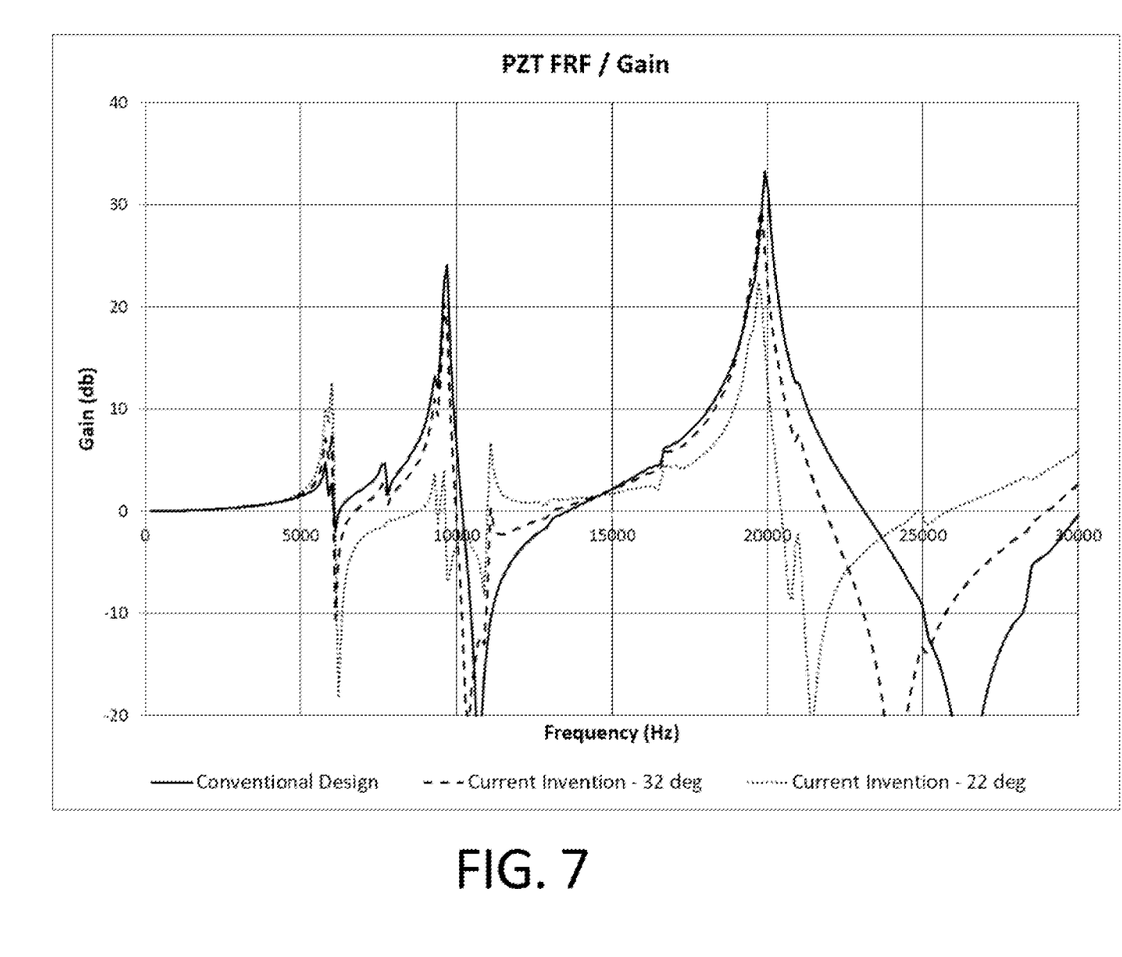
FIG. 7 is a graphical illustration of the frequency response function of the conventional tri-stage suspension of FIG. 1, and the exemplary tri-stage suspension of FIG. 4B.

FIG. 7 is a graphical illustration of the frequency response function of the exemplary tri-stage suspension of FIGS. 4A and 4B. The frequency response function of the rectangularly shaped first and second actuators 210, 212 and the non-right angle parallelogram shaped first and second actuators 310, 312 is shown in FIG. 7. The non-right angle parallelogram shaped first and second actuators 310, 312 are indicated with two shapes: one with its acute angles equal to thirty-two (32) degrees and the second with its acute angles equal to twenty-two (22) degrees. As shown in FIG. 7, while the suspension incorporating the non-right angle parallelogram shaped actuators with acute angles of 32 degrees reduces the arm sway gain at 10 kHz, the suspension incorporating the non-right angle parallelogram shaped actuators with acute angles of 22 degrees more significantly reduces the arm sway gain at 10 kHz. The non-right angle parallelogram shaped actuators can be implemented in conventional mount plates with only modest modifications (which is ideal because conventional mount plates can have stringent geometric tolerances). As shown in FIG. 7, the frequency response for non-right angle parallelogram shaped actuators with their acute angle equal to 22 degrees offers significant arm sway gain reduction. However, it has been determined that reduced arm sway gain can be achieved with the PZT acute angle being less than 45 degrees.

Figure 8:
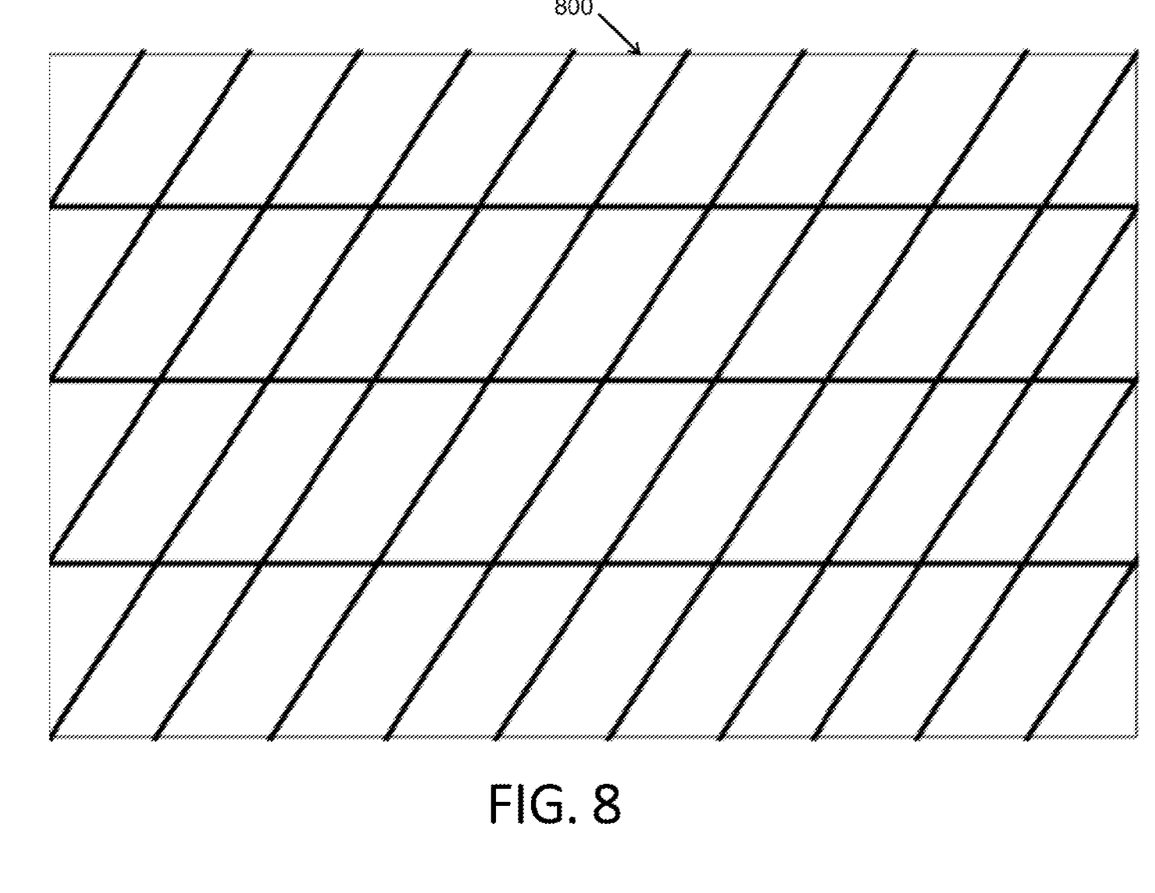
FIG. 8 is a parallelogram PZT die casting, according to an example of the disclosure.

FIG. 8 illustrates the cutting setup for the non-right angle parallelogram PZT actuator wafer 800, which is cut into multiple non-right angle parallelogram PZT pieces after the electrical polarization. The manufacturing method of the non-right angle parallelogram PZT actuators are substantially identical to the conventional rectangular shaped PZT actuator except the non-perpendicular wafer cutting. In some examples, crystal elements may be implemented in lieu of piezoelectric material to form the non-right angle parallelogram shaped actuators.

It will be understood that terms such as "upper," "lower," "above," "best," and x-direction, y-direction, and z-direction as used herein as terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

It will be appreciated that the term "present disclosure" as used herein should not be construed to mean that only a single disclosure having a single essential element or group of elements is presented. Similarly, it will also be appreciated that the term "present disclosure" encompasses a number of separate innovations, which can each be considered separate disclosures. Although the present disclosure has been described in detail with regards to the preferred examples and drawings thereof, it should be apparent to those skilled in the art that various adaptations and modifications of examples of the present disclosure may be accomplished without departing from the spirit and the scope of the disclosure.

We claim:

1. A suspension assembly, comprising:
   a tri-stage suspension comprising:
   a mount plate attached to a distal end of a load beam;
   a first actuator shaped as a non-right angle parallelogram and spanning across a first opening in the mount plate; and
   a second actuator shaped as a non-right angle parallelogram and spanning across a second opening in the mount plate, wherein each of the first actuator and second actuator include a first set of parallel sides extending along a length of the tri-stage suspension at an angle and a second set of parallel sides extending along a width of the tri-stage suspension at an angle, with the first set of parallel sides are longer than that of the second set of parallel sides.

2. The suspension assembly of claim 1, further comprising a gimbal assembly attached to the load beam, wherein the gimbal assembly includes a slider configured to write digital information on a rigid rotating disk.

3. The suspension assembly of claim 2, further comprising a first micro-actuator and a second micro-actuator integrated within the gimbal assembly.

4. The suspension assembly of claim 1, wherein the first and second actuators are integrated into the load beam.

5. The suspension assembly of claim 1, wherein each of the first and second actuators includes:
   a first set of parallel sides;
   a second set of parallel sides; and
   an acute angle of less than 45 degrees at an intersection of at least one of the first set of parallel sides and at least one of the second set of parallel sides.

6. The suspension assembly of claim 1, wherein:
   the first actuator is configured to expand toward the distal end and a first side edge of the mount plate; and
   the second actuator is configured to expand toward the distal end and a second side edge of the mount plate.

7. The suspension assembly of claim 6, wherein expansion of the first actuator causes the load beam to rotate with a rotation center located along the load beam.

8. A suspension assembly, comprising:
   a mount plate attached to a distal end of a load beam;
   a first actuator attached to the load beam, wherein the first actuator has a non-right angle parallelogram shape and is configured to deflect the distal end of the mount plate; and
   a second actuator attached to the load beam, wherein the second actuator has a non-right angle parallelogram shape and is configured to deflect the distal end of the mount plate, wherein each of the first actuator and second actuator include a first set of parallel sides extending along a length of the suspension assembly at an angle and a second set of parallel sides extending along a width of the suspension assembly at an angle, with the first set of parallel sides are longer than that of the second set of parallel sides.

9. The suspension assembly of claim 8, wherein:
   the first actuator spans across a first opening in the mount plate; and
   the second actuator spans across a second opening in the mount plate.

10. The suspension assembly of claim 8, further comprising a gimbal assembly attached to the load beam, wherein the gimbal assembly includes a slider configured to write digital information on a rigid rotating disk.

11. The suspension assembly of claim 10, further comprising a first micro-actuator and a second micro-actuator integrated within the gimbal assembly.

12. The suspension assembly of claim 8, wherein the first and second actuators are integrated into the load beam.

13. The suspension assembly of claim 8, wherein each of the first and second actuators includes:
   a first set of parallel sides;
   a second set of parallel sides; and
   an acute angle of less than 45 degrees at an intersection of at least one of the first set of parallel sides and at least one of the second set of parallel sides.

14. The suspension assembly of claim 8, wherein:
   the first actuator is configured to expand toward the distal end and a first side edge of the mount plate; and
   the second actuator is configured to expand toward the distal end and a second side edge of the mount plate.

15. The suspension assembly of claim 8, wherein the deflection of the distal end by the first actuator causes the load beam to rotate with a rotation center located along the load beam.

* * * * *